INVENTOR
JOSEPH C. WASILEWSKI

INVENTOR
JOSEPH C. WASILEWSKI
BY Herman L Gordon
ATTORNEY

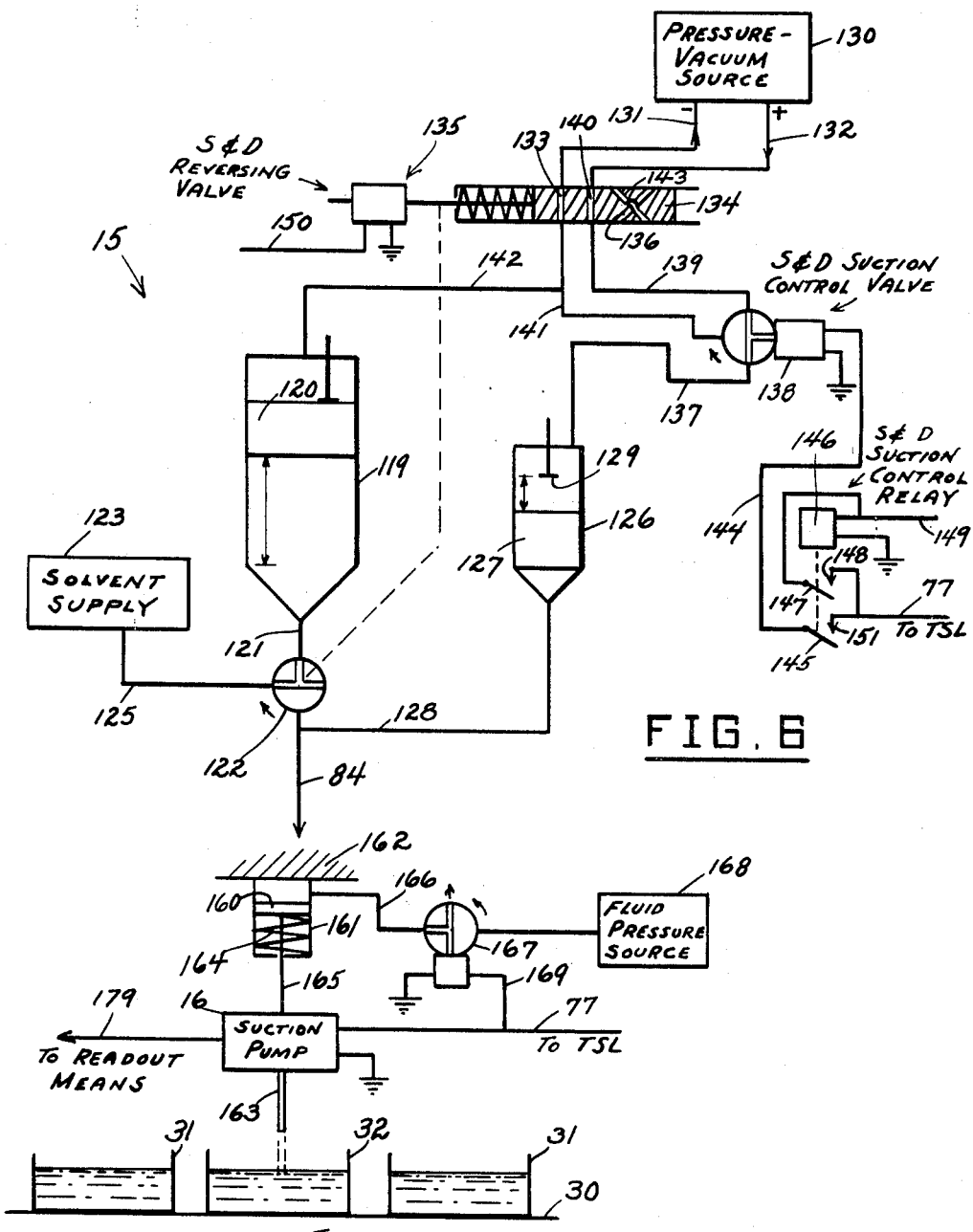

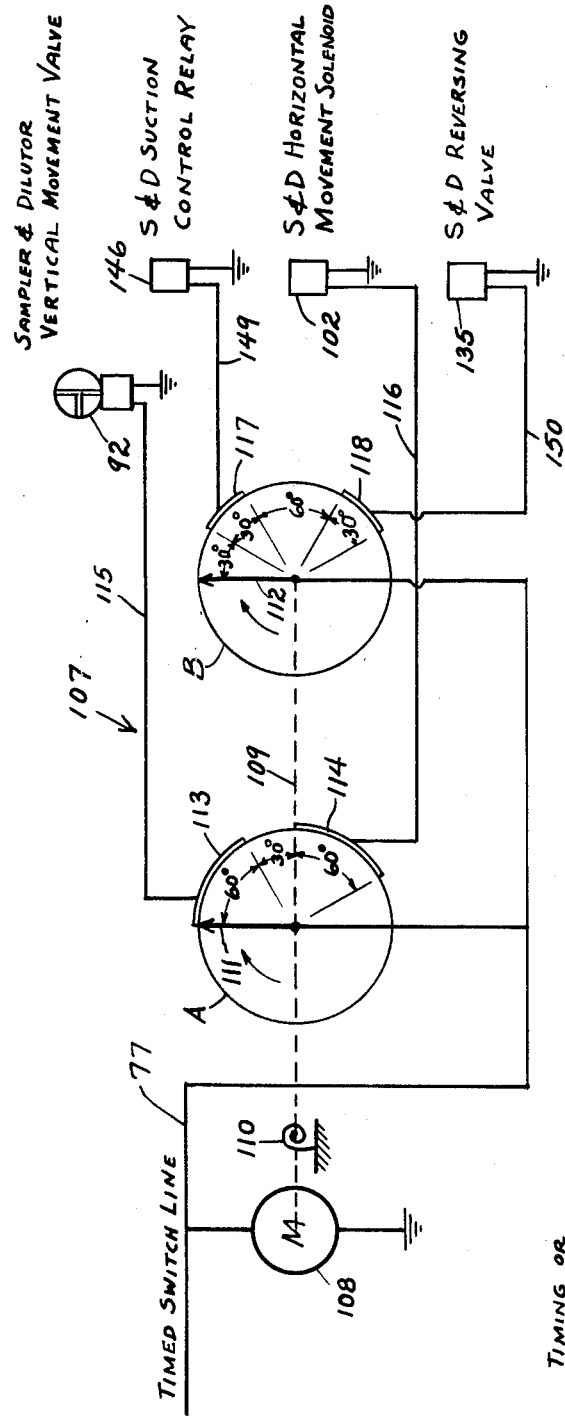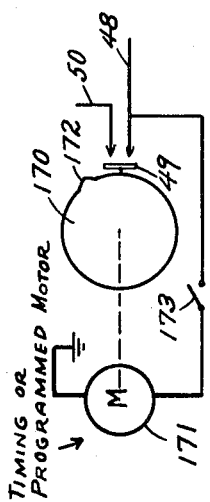

United States Patent Office 3,432,271
Patented Mar. 11, 1969

3,432,271
AUTOMATIC ANALYTICAL APPARATUS
Joseph C. Wasilewski, Silver Spring, Md., assignor to American Instrument Co., Inc., Silver Spring, Md.
Filed May 2, 1966, Ser. No. 547,006
U.S. Cl. 23—253                     10 Claims
Int. Cl. G01n 31/00; B08b 3/00

This invention relates to improvements in apparatus for automatically conducting analytical procedures, and more particularly to an apparatus capable of carrying out a procedure wherein a sample is subjected to a succession of treatments, such as agitation, dilution, filtration, and the like, and is subsequently delivered to a readout device for evaluation.

A main object of the invention is to provide a novel and improved automated apparatus for conducting analytical procedures or procedural steps, said apparatus involving relatively simple components, being reliable in operation, and providing a high degree of uniformity in subjecting successive samples to the succession of procedural steps performed thereby, thus assuring accuracy as well as economy in operation.

A further object of the invention is to provide an improved automated apparatus for processing a sample undergoing chemical analysis, said apparatus being capable of carrying out automatically substantially the same procedures heretofore accomplished by laboratory technicians, but with a much higher degree of precision and uniformity, the apparatus involving relatively inexpensive parts, being easy to adjust, and being easy to maintain in proper working condition.

A still further object of the invention is to provide an improved automated apparatus for performing steps in an analytical procedure, such as extracting a sample, diluting the sample with a precisely known amount of solvent, agitating the sample and solvent, filtering the resulting solution, extracting a precisely known quantity of the filtered solution, adding a precisely known quantity of additional solvent to the extracted quantity of solution, and delivering the resultant diluted solution to a readout device for evaluation, these steps being performed in a regular sequence which is continuously repeated with successive like amounts of the sample with precise repetitive regularity, and without requiring any human supervision, the containers for the samples and subsequent dilutions thereof being used over and over again in a regular cycle, said containers being emptied, washed, and dried automatically during the cycle so that a clean, dry container is always presented for receiving a sample.

Further objects and advantages of the invention will become apparent from the following description and claims, and from the accompanying drawings, wherein:

FIGURE 6 is a schematic diagram showing the sampler and dilutor assembly employed in the apparatus of FIGURE 1, and the fluid and electrical circuits associated with the components of this assembly.

FIGURE 7 is a schematic diagram of the readout extraction system employed in the apparatus of FIGURE 1, showing the means associated therewith for controlling the vertical movement of its suction pump.

FIGURE 8 is a partial circuit diagram showing the means for sequentially energizing the various sections of the apparatus of FIGURE 1 to provide correct cyclic actuation thereof.

FIGURE 9 is a fragmentary circuit diagram showing an alternative means for triggering operation of the system of FIGURE 1, employing a repetitive or programmed motor-driven main control switch instead of a manually-operated main control switch.

Figure 1:
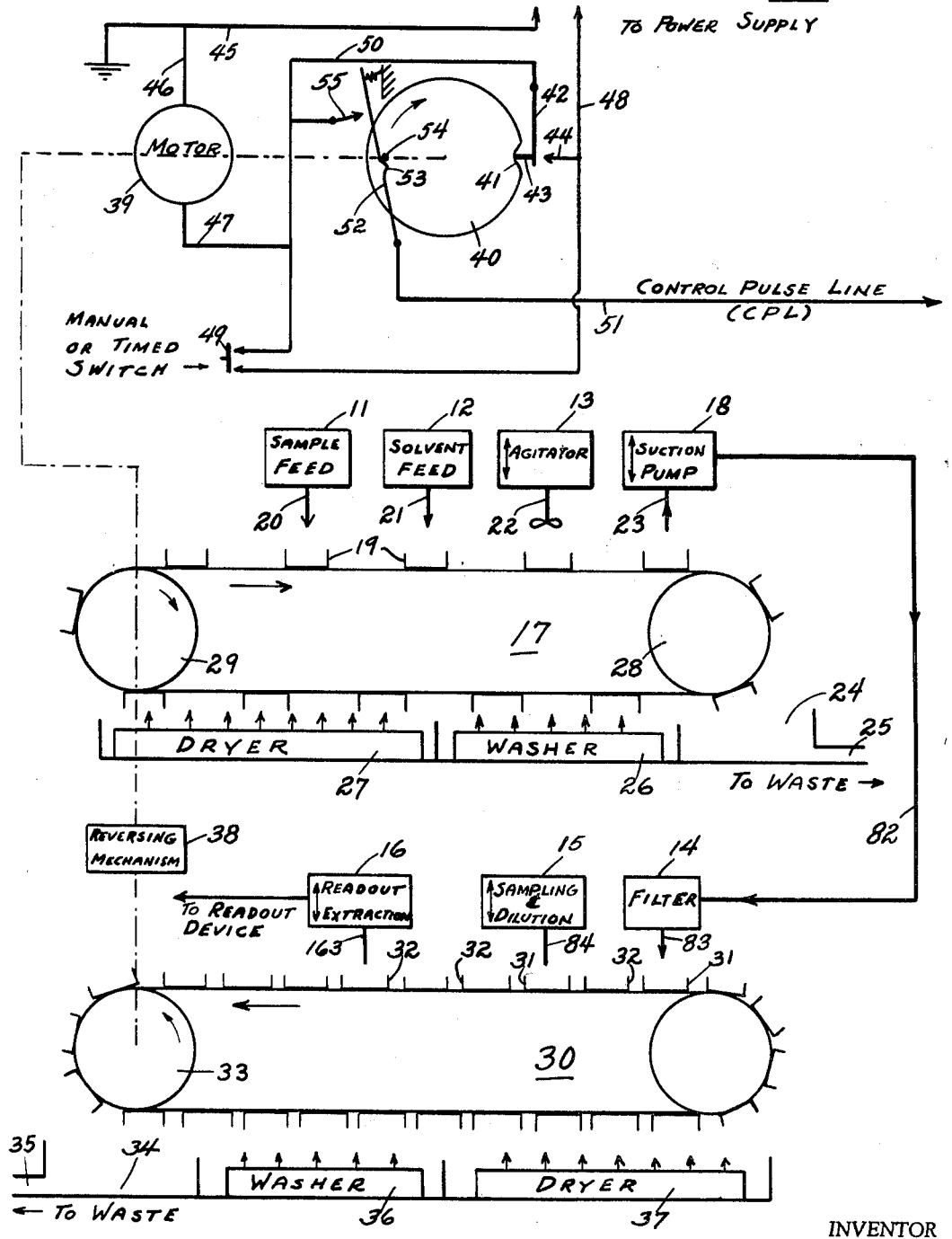
FIGURE 1 is a schematic diagram of an improved automated apparatus constructed in accordance with the present invention, showing the control circuitry for the main conveyor motor and showing an associated cyclic pulse-forming device.

Referring to the drawings, FIGURE 1 shows in schematic form a typical automatic analyzing apparatus according to the present invention, the apparatus being adapted to receive a definite-quantity sample of material to be analyzed, for example, a capsule or the like, from a sample-feeding source 11, and after suitable processing, including dissolving the sample in a definite quantity of solvent from a solvent-feeding source 12, agitating the sample in the solvent by means of an agitator 13, passing the solution through a filter 14, taking a definite quantity of the filtered solution and re-diluting same by means of a sampling and dilution apparatus 15 with a definite further quantity of a solvent, and finally extracting the resultant solution and feeding it to a suitable read-out device by means of a read-out extraction apparatus 16. The read-out device may be of any suitable type, such as a spectrophotometric apparatus, a thermometric apparatus, a conductivity apparatus, or the like, which can provide a quantitative read-out.

The system shown in FIGURE 1 is particularly applicable for analyzing capsules containing specific substances, for inspection purposes, to ascertain the percentage content of such substances in the capsules, but may be readily modified as required, for analyzing other materials from which samples can be readily obtained. For example, the system may employ only one stage of reagent insertion, as where the sample must be treated with only a single reagent.

In the typical system shown in FIGURE 1, 17 designates a first belt conveyor whose top run is located subjacent the suitably supported sample feed device 11, solvent feed device 12, agitator 13, and a suction pump device 18. The devices 11, 12, 13 and 18 are spaced substantially evenly over the top run of belt conveyor 17, at distances substantially equal to the uniform longitudinal spacings of successive longitudinally aligned trays 19 mounted on the conveyor belt. The sample feed device 11 has a depending outlet conduit 20, the solvent feed device 12 has a depending outlet conduit 21, the agitator 13 has a depending impeller 22, and the suction pump device 18 has a depending intake conduit 23, the depending elements 20 to 23 being located so that they can be simultaneously positioned over successive trays 19 on the top run of the conveyor belt, as shown in FIGURE 1. The top run of said belt moves toward the right, as viewed in FIGURE 1, namely, the belt moves in a clockwise direction.

Beneath the right end of the belt conveyor 17 is a receptacle 24 leading to a waste conduit 25, for disposing of the remaining contents of trays 19 passing around the right roller 28 of the belt. Adjacent receptacle 24 beneath the bottom run of the belt is a tray-washing apparatus 26 adapted to project jets or sprays of washing liquid against the inverted emptied trays 19 located thereover, to thoroughly cleanse same. Beneath the left portion of the bottom run of the conveyor belt, adjacent the washer 26 is a tray-drying apparatus 27, adapted to dry the cleansed trays, for example, by means of radiant heat, hot air jets, or a combination thereof.

After drying, the cleansed trays move with the belt around the left roller 29 toward positions where they will be ultimately again located beneath the stations 11, 12, 13, and 18, in a manner presently to be described.

Arranged adjacent to the belt conveyor 17, for example in side-by-side relation thereto, is a second belt conveyor 30 generally similar to belt conveyor 17 but having two staggered longitudinal rows of evenly spaced trays 31 and 32 mounted thereon. The belt conveyor 30 moves in a direction opposite to that of belt conveyor 17, namely, in a counterclockwise direction, as viewed in FIGURE 1, so as to conserve space because of the side-by-side arrangement of the belt conveyors.

After the trays 32, 31 pass around the left end roller 33 of belt conveyor 30, the contents of the trays empty into a receptacle 34 leading to a waste conduit 35. Subsequently, the inverted trays are washed by a washing apparatus 36, similar to the washer 26, and are eventually dried by a drying apparatus 37, similar to the drying apparatus 27.

The drive rollers 29 and 33 are coupled together through a suitable reversing mechanism 38, such as a conventional differential mechanism, and are driven simultaneously by a common drive motor 39 provided with step-wise energizing means, so that the belt conveyors are driven in steps corresponding to the spacing between the successive trays 19 on belt conveyor 17, and the spacing between the successive trays 31 in one longitudinal row and the spacing between the successive trays 32 in the other longitudinal row on belt conveyor 30. If the reversing mechanism 38 has a 1:1 ratio, these spacings are all identical, so that one cycle of energization of motor 39 will advance the trays on the belt conveyors through a distance corresponding to one step, for example, the distance between elements 20 and 21, or 21 and 22, etc.

The cycle of energization of motor 39 is determined by a cam 40 driven by the motor, said cam having a peripheral notch 41. A spring contact arm 42 is mounted adjacent the cam periphery and has a follower lug 43 normally engaging in said notch, which allows arm 42 to disengage from a stationary contact 44. Cam 40 rotates clockwise, as viewed in FIGURE 1, and as soon as it starts to rotate, arm 42 is cammed into engagement with contact 44.

One terminal wire 46 of motor 39 is connected to a grounded power supply conductor 45. The other motor terminal wire 47 is connected to the remaining power supply conductor 48 through a normally open push button switch 49. Wire 47 is also connected by a wire 50 to switch arm 42. Since contact 44 and switch arm 42 are in shunt with switch 49, the motor 39 will remain energized for one cycle of rotation of cam 40 after switch 49 is momentarily closed.

Thus, the conveyors 29 and 33 may be advanced through one step, as above described, by momentarily closing switch 49. The motor will become deenergized at the end of said step by the opening of contacts 42–44.

As shown in FIGURE 1, a means is provided for momentarily connecting a "Control Pulse Line" 51 to the wire 50 immediately prior to the opening of contacts 42–44. Thus, a switch arm 52 is pivotally mounted on a suitable support adjacent the cam 40, said arm having a cam element 53 thereon located in the path of movement of a pin 54 on cam disc 40. Cam disc 40 rotates clockwise, as viewed in FIGURE 1. As the cam nears the end of its cycle of rotation, pin 54 engages cam element 53 and rotates arm 52 outwardly into engagement with a stationary contact 55. The "CPL" conductor 51 is connected to arm 52. Contact 55 is connected to wire 50. Thus, wire 51 is connected to wire 50 when arm 52 engages contact 55.

As lug 43 enters notch 41, pin 54 slips past cam element 53, allowing contacts 52–55 to open approximately at the same time that contacts 42–44 open.

Figure 2:
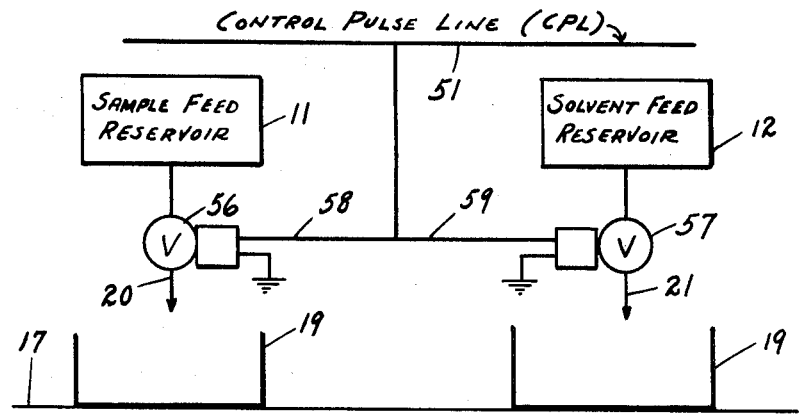
FIGURE 2 is a schematic diagram showing the control circuit for the sample feed and solvent feed reservoirs employed at the initial stages of the apparatus of FIGURE 1.

As the cam 40 nears the end of its cycle of rotation, as above mentioned, a pair of trays 19 (as shown in FIGURE 2) will be respectively located beneath the discharge conduits 20 and 21 of the sample feed device 11 and the solvent feed device 12. The discharge conduits 20 and 21 are provided with respective solenoid valve or gate devices 56 and 57, each having one terminal of its operating winding grounded. The remaining terminals of the operating windings are connected by wires 58 and 59 to the "control pulse line" 51, so that when line 51 becomes energized by the closure of contacts 52–55, devices 56 and 57 become energized and respectively allow a quantity or capsule of sample material to discharge from the reservoir 11 and a quantity of solvent to discharge from the reservoir 12, so as to be delivered to the subjacent trays 19. Thus, a tray 19 which received a quantity or capsule of sample material from reservoir 11 in the previous cycle receives a quantity of solvent from reservoir 12. The valve or gate devices 56 and 57 close as soon as line 51 becomes deenergized.

Figure 3:
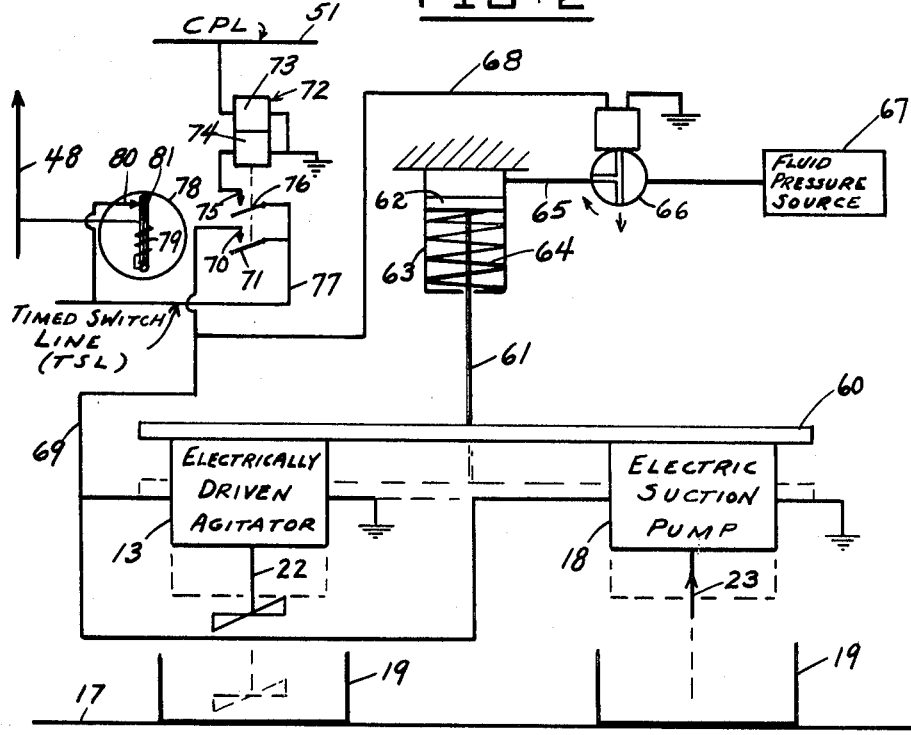
FIGURE 3 is a schematic diagram showing the system for lowering the agitator and the suction pump sections of the apparatus of FIGURE 1, and the control circuits associated with the electrical elements of this system.

As shown in FIGURE 3, at the time that the "control pulse line" 51 becomes energized, another pair of trays 19 will be respectively located below the agitator impeller 22 and the suction pump intake conduit 23. The agitator 13 and the suction pump 18 are secured to the underside of a common supporting plate member 60 which is rigidly secured at its mid-portion to the depending piston rod 61 of a piston 62 contained in a vertical fluid pressure cylinder 63. The piston 62 is normally supported in an elevated position by a coiled spring 64 surrounding the piston rod in the lower portion of cylinder 63 and bearing between the piston 62 and the bottom end of the cylinder. The upper portion of cylinder 63 is connected by a conduit 65 and a normally-vented electromagnetic three-way valve 66 to a suitable fluid pressure source 67. One terminal of the operating winding of valve 66 is grounded. The other terminal thereof is connected by a wire 68 to a wire 69. Wire 69 is connected to the stationary contact 70 associated with one of the poles 71 of a double-wound, two-pole relay 72 having the respective operating windings 73 and 74.

One terminal of each of the windings 73, 74 is grounded. The remaining terminal of winding 73 is connected to wire 51. The remaining terminal of winding 74 is connected to the stationary contact 75 associated with the remaining pole 76 of the relay. Poles 71 and 76 are connected to a "timed switch line" 77. Line 77 is connected to the power supply wire 48 through a normally closed, slow-opening thermal or other suitable delay switch 78. Assuming the delay switch employed to be of the thermal type, as shown, the heater winding of the switch is designated at 79. The delay switch 78 is designed to open its contacts 80–81 a predetermined time period after its winding 79 becomes energized by the load current flowing between line 77 and the power supply wire 48.

The motors of the agitator 13 and the suction pump 18 are respectively connected between wire 69 and ground, whereby said motors will become energized when contacts 70–71 close. When relay winding 73 becomes energized, responsive to the energization of line 51, contacts 75–76 close and energize the holding winding 74. This keeps contacts 70–71 closed until holding winding 74 becomes deenergized by the opening of contacts 80–81 of delay switch 78, which deenergizes the "timed switch line" 77.

Therefore, when line 51 receives a pulse, by the closure of contacts 52–55, relay 72 becomes energized and energizes line 77. Valve 66 becomes energized through wires 68 and 69, contacts 70–71 and line 77, causing fluid pressure to enter the upper portion of cylinder 63 and to force piston 62 down, lowering support 60 and causing agitator 22 and intake conduit 23 to be immersed in the contents of their subjacent trays 19. Simultaneously, the driving motors of agitator 13 and suction pump 18 become energized through wire 69, contacts 70–71 and line 77. Energization continues for the time during which contacts 80–81 remain closed. At the end of this time, relay 72 becomes deenergized by the deenergization of line 77, causing valve 66 to return to its normal vented condition, which releases piston 62 and allows spring 64 to elevate support 60 to its normal raised position, and which simultaneously deenergizes the driving motors of agitator 13 and suction pump 18.

During the energization of suction pump 18 it delivers solution from the tray 19 subjacent thereto to a tray 31 on the adjacent belt conveyor 30 through a conduit 82 and the filter device 14. As shown in FIGURE 1, filter device 14 has a discharge conduit 83 located above a tray 31 near the right end of belt conveyor 30. The sampling and dilution device 15 has its intake-discharge conduit 84 located above the next adjacent tray 31 located to the left of the filter device 14, as viewed in FIGURE 1.

Figure 4:
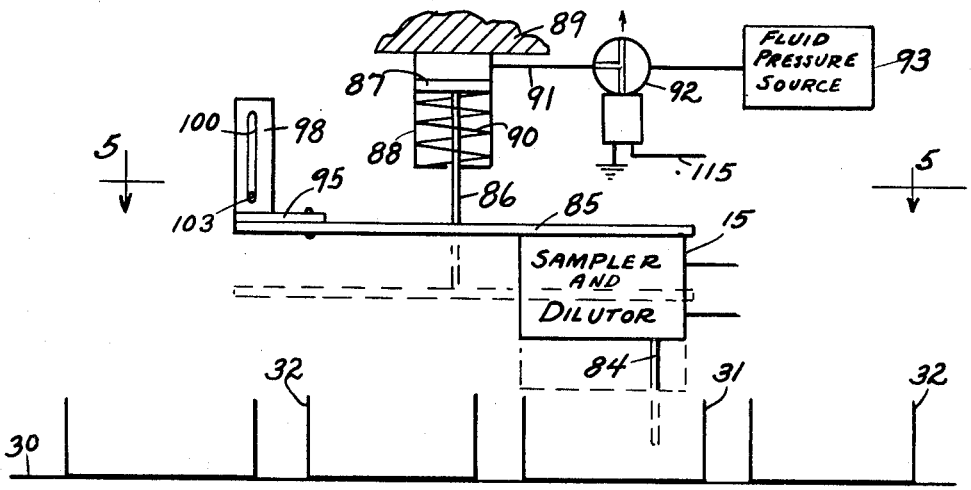
FIGURE 4 is a schematic side elevational view of the portion of the system of FIGURE 1 which contains the sampler and dilutor assembly, showing the associated descent-control valve for controlling vertical movement of this assembly.
Figure 5:
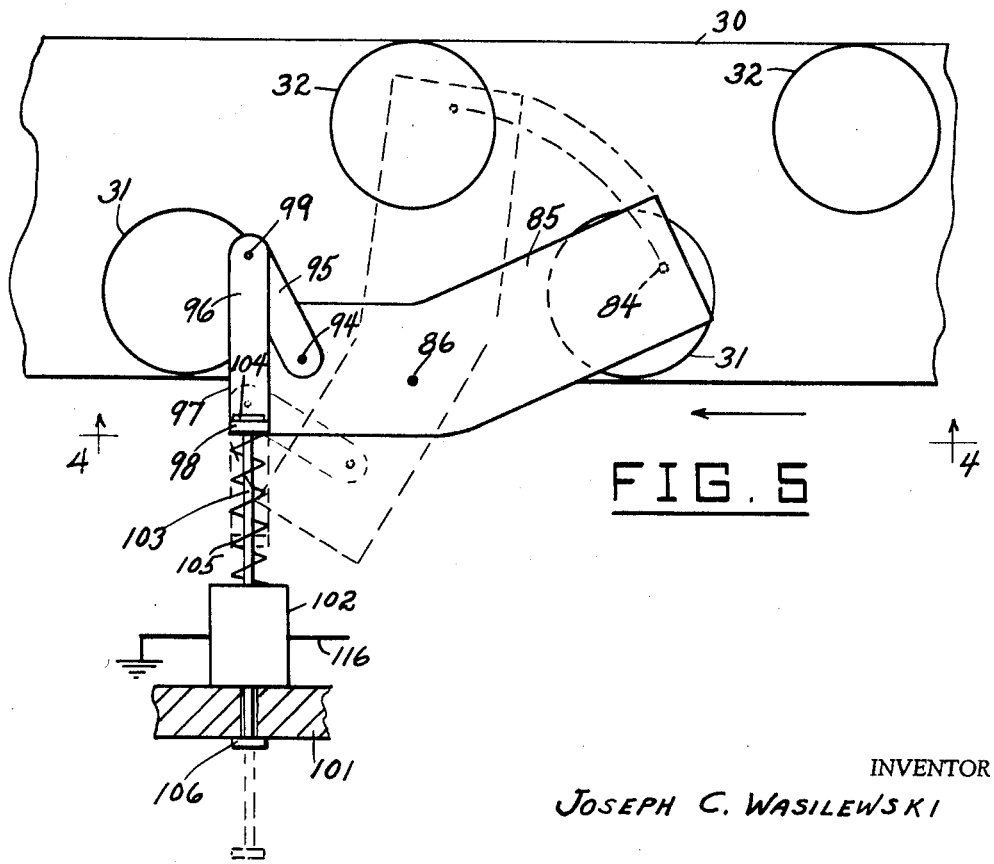
FIGURE 5 is a horizontal cross-sectional view taken substantially on line 5—5 of FIGURE 4, showing the mechanism for swinging the sampler and dilutor assembly horizontally.

As shown in FIGURES 4 and 5, the sampling and dilution device 15 is secured to and depends from the underside of one end portion of a horizontal plate-like arm 85. A vertical piston rod 86 depending from a piston 87 is secured to the mid-portion of arm 85, the piston being slidably, sealingly and rotatably contained in a vertical fluid pressure cylinder 88 secured to and depending from a stationary support 89. Piston 87 is biased upwardly by a coiled spring 90 in the lower portion of cylinder 88 surrounding piston rod 86 and bearing between piston 87 and the bottom wall of the cylinder. The top end portion of the cylinder is connected through a conduit 91 and a normally-vented electromagnetic three-way valve 92 to a suitable fluid pressure source 93. Spring 90 normally supports arm 85 at a sufficient height to provide ample clearance between intake-discharge conduit 84 and the trays 31 on conveyor 30 to allow the trays to move therepast. When valve 92 becomes energized, fluid under pressure is admitted into the top portion of cylinder 88, forcing piston 87 down, and lowering arm 85 so that conduit 84 will be immersed in the contents of a subjacent tray 31.

Pivoted at 94 to the opposite end portion of arm 85 is a link bar 95 which is in turn pivotally connected at 99 to the end of the horizontal arm 96 of a right-angle bracket member 97. Member 97 is provided with the vertical upstanding arm 98 formed with a vertical slot 100.

Horizontally secured to a stationary vertical support member 101 adjacent conveyor 30 is a solenoid 102 extending transverse to the conveyor belt and having a double-headed plunger rod 103. One end portion of rod 103 extends slidably through slot 100, the head element 104 thereof being biased against arm 98 by a coiled spring 105 surrounding the rod 103 and bearing between solenoid 102 and arm 98, as shown in FIGURE 5. The opposite end portion of the rod extends through support 101 and the head element 106 thereof is normally urged against support 101 by the action of spring 105.

When solenoid 102 becomes energized, it retracts rod 103, whereby the linkage defined by bracket 97 and link arm 95 causes the arm 85 to swing in a counterclockwise direction, as viewed in FIGURE 5, from the full-line position thereof to the dotted view position thereof, whereby the conduit 84 is swung from a position overlying a tray 31 to a position overlying an adjacent tray 32. As will be presently explained, this enables a measured quantity of solution to be withdrawn from the subjacent tray 31 and to be transferred, together with a measured quantity of further solvent added thereto, to said adjacent tray 32.

Upon deenergization of solenoid 102, spring 105 returns the parts to their full-line positions shown in FIGURE 5.

The energization of solenoid 102 is controlled by the operation of a two-wafer motor-driven timed switch assembly 107, shown diagrammatically in FIGURE 8, which also controls the energization of valve 92 and the operating components of the sampling and dilution device 15, as will be presently described.

The timed switch assembly 107 comprises a timing drive motor 108 whose shaft, shown diagrammatically at 109, has secured thereon respective contact poles 111 and 112 engaging on the spaced fixed switch wafers A and B. Shaft 109 is biased toward a predetermined starting position by a suitable means, such as a spiral spring 110. Pole 111 normally engages a first arcuate contact strip 113 on wafer A, said strip subtending an angle of 60°, as shown. Pole 111 is also subsequently engageable with a second arcuate contact strip 114 on wafer A, also subtending an angle of 60°, but spaced away from strip 113 by 90°, as shown, in terms of phase displacement.

Poles 111 and 112 are connected to the "timed switch line" 77. One terminal of the operating winding of valve 92 is grounded. The remaining terminal thereof is connected by a wire 115 to contact strip 113. One terminal of solenoid 102 is grounded. The remaining terminal thereof is connected by a wire 116 to contact strip 114.

Pole 112 is engageable with a first arcuate contact strip 117 on wafer B, subtending an angle of 30°, but engagement of pole 112 with strip 117 does not begin until pole 111 has travelled 30° on strip 113. Pole 112 is also subsequently engageable with a second 30° arcute strip 118 on wafer B, but this engagement does not begin until pole 111 has travelled 30° on strip 114.

Referring to FIGURE 6, the sampling and dilution device 15 comprises a first burette 119 provided with an air-operated piston 120 in its barrel and provided at its bottom end with an outlet conduit 121 including a three-way valve 122, leading to the depending vertical intake-discharge conduit 84. A solvent supply reservoir 123 is connected by a conduit 125 to the side connection of valve 122, as viewed in FIGURE 6. Valve 122 is shown in its normal position, namely, wherein conduit 125 is placed in communication with conduit 121 and the lower end of burette 119.

Designated at 126 is a second, relatively smaller, burette provided with an air-operated piston 127 and provided at its bottom end with an outlet conduit 128 connected to the upper portion of intake-discharge conduit 84, so that there is a substantial length of conduit depending below the joint between conduits 128 and 84. The internal volume of this depending length of conduit is substantially equal to the increment of volume in the space in the barrel of burette 126 below piston 127 obtained when the piston moves upwardly from its normal lowermost position to a position engaging an adjustable stop 129 provided in the top end of the burette 126. In other words, assuming valve 122 to be in the position shown in FIGURE 6, when piston 127 is moved upwardly from its illustrated lowermost position to a position engaging stop 129, it can draw a volume of solution into conduit 84 sufficient to fill same almost up to the joint between conduits 84 and 128.

Designated at 130 is a conventional pressure-vacuum source, such as an air pump, having a vacuum conduit 131 and a pressure conduit 132. The top end of burette 119 is normally connected to vacuum conduit 131 through a conduit 142 and a transverse passage 133 in the piston 134 of a solenoid-operated reversing valve 135. When valve 135 is energized, conduit 142 is connected to pressure conduit 132 through one reversing passage 136 of piston 134.

The top end of burette 126 is normally connected to pressure conduit 132 through a conduit 137, a normally deenergized solenoid-operated three-way valve 138, a conduit 139, and a second transverse passage 140 in the piston 134 of valve 135. The conduit 142 is connected to the normally blanked side connection of three-way valve 138 by a conduit 141. When valve 138 is energized, conduit 141 is connected to conduit 137 and the valve connection to conduit 139 is blanked. With valve 138 deenergized, when valve 135 is energized, the top end of burette 126 is connected to vacuum conduit 131 through conduit 137, valve 138, conduit 139, and a second reversing passage 143 of piston 134.

One terminal of the operating winding of valve 138 is grounded and the other terminal thereof is connected by a wire 144 to one pole 145 of a two-pole relay 146. The pole 145 is engageable with a stationary contact 151 responsive to the energization of relay 146. The other pole 147 is engageable with a stationary contact 148. Contacts 151 and 148 are connected to the "timed switch line" 77.

One terminal of the winding of relay 146 is grounded and the other terminal thereof is connected by a wire 149 to the arcuate contact strip 117 associated with timed switch pole 112. Relay pole 147 is connected to wire 149.

One terminal of the operating winding of solenoid valve 135 is grounded and the other terminal thereof is connected by a wire 150 to the remaining arcuate contact strip 118 associated with timed switch pole 112.

Three-way valve 122 is mechanically coupled to reversing valve 135 so as to be operated simultaneously therewith. In other words, when reversing valve 135 is energized, three-way valve 122 is actuated to blank off solvent supply conduit 125 and to connect conduit 121 to discharge conduit 84.

As above mentioned, the "timed switch line" 77 becomes energized responsive to the energization of relay 72, caused by a pulse on line 51, and line 77 remains energized for the definite time period required for contacts 80–81 to open. The energization of line 77 starts timing motor 108 and also energizes valve 92 through line 77, pole 111, strip 113 and wire 115. This lowers the sampling and dilution device 15, causing conduit 84 to become immersed in the contents of the subjacent tray 31. Device 15 remains lowered for the time required for pole 111 to sweep over the 60° subtended by strip 113.

As pole 112 engages strip 117 (after pole 111 has rotated 30°) relay 146 becomes energized from line 77 through pole 112, strip 117 and wire 149, and is thereafter held energized (as long as line 77 remains energized) by its holding contacts 147–148. Conduit 137 is thus connected to conduit 141 and conduit 139 is blanked. Piston 127 is raised by the suction in the top portion of burette 126 and draws a quantity of solution into conduit 84, the volume of said quantity being determined by the adjustment of stop 129, and being any desired amount up to the total volume between the bottom end of conduit 84 and the joint between conduits 84 and 128.

At the end of the first 60° of rotation of pole 111 it leaves strip 113, deenergizing valve 92 and allowing spring 90 to elevate device 15 to its normal position of FIGURE 4.

As pole 111 engages strip 114 (after 90° total rotation), solenoid 102 becomes energized through line 77, pole 111, strip 114 and wire 116, swinging arm 84 to its dotted view position of FIGURE 5. Arm 84 remains in this position as long as pole 111 engages strip 114, namely, for an additional 60° of rotation thereof.

As pole 112 engages strip 118 (after a total of 120° of rotation of pole 111) the reversing valve 135 becomes energized, through line 77, pole 112, strip 118 and wire 150. Conduits 141 and 142 are connected to pressure conduit 132 through passage 136, and three-way valve 122 connects conduit 121 to conduit 84. Pistons 120 and 127 are forced down in the barrels of their burettes, causing the solution in conduit 84 to be flushed into the subjacent tray 32.

As pole 111 leaves strip 114 and pole 112 leaves strip 118 (after 150° total rotation of shaft 109), solenoid 102 becomes deenergized and reversing valve 135 becomes deenergized. This allows spring 105 to return arm 85 to its normal full-line position shown in FIGURE 5, and returns three-way valve 122 to its normal position of FIGURE 6, connecting conduits 125 and 121. Conduit 142 is connected to vacuum conduit 131 through passage 133, applying suction to piston 120 and drawing solvent from reservoir 123 into burette 119.

Delay switch 78 is adjusted so that contacts 80–81 open shortly after pole 111 leaves strip 114, namely, after shaft 109 has rotated at least 150° and prior to full 360° rotation thereof. When line 77 becomes deenergized (by the opening of contacts 80–81), relay 146 is released, deenergizing valve 138 and restoring the normal connection of conduit 137 to pressure conduit 132 through passage 140 and conduit 139. This also deenergizes motor 108, whereby spring 110 resets shaft 109 to its starting position, placing device 15 in readiness for its next cycle of operation, which occurs after the belt conveyors 17, 30 have been actuated through their next step of movement.

The readout extraction suction pump device 16 is supported from the piston 160 of a depending air cylinder 161 secured to a suitable fixed support 162, being normally held in an elevated position such that its depending intake conduit 163 is clear of a subjacent tray 32, as shown in FIGURE 7, by a coiled spring 164 surrounding the piston rod 165 and bearing between piston 160 and the bottom of cylinder 161. The upper portion of cylinder 161 is connected by a conduit 166 and a normally vented three-way solenoid valve 167 to a suitable fluid pressure source 168. One terminal of the operating winding of valve 167 is grounded and the other terminal thereof is connected by a wire 169 to the "timed switch line" 77. One terminal of the pump motor of device 16 is grounded and the other terminal thereof is connected to line 77. When line 77 is energized, said pump motor and valve 167 become energized, causing device 16 to be lowered so that the intake conduit 163 is immersed in the solution in the subjacent tray 32, and causing said solution to be extracted and to be forced through the readout delivery conduit 179 of device 16. When line 77 becomes deenergized by the opening of contacts 80–81, valve 167 and the readout suction pump motor become deenergized, and the upper portion of cylinder 161 is vented through conduit 166 and valve 167, allowing spring 164 to elevate the readout device 16 to its normal inactive position, shown in full line view in FIGURE 7.

It will be understood that a cycle of operation of each of the various devices 11, 12, 13, 18, 15 and 16 will be obtained responsive to the pulsing of the line 51, caused by the completion of a step of movement of the belt conveyors 17, 30. The devices 13, 18, 15 and 16 will be timed by the slow-opening switch device 78, whose cycle is initiated by the energization of relay 72, and which controls the period of energization of the "timed switch line" 77. Thus, a complete cycle of operation of the apparatus is obtained responsive to each actuation of push button switch 49, provided that the actuations are spaced apart by delays greater than that of the time required for a cycle of operation.

To insure proper intervals between actuation of the triggering switch of the apparatus, these actuations may be timed or programmed in the manner illustrated in FIGURE 9. Thus, the triggering switch 49 may be operated by a timed cam 170 driven by a timing or programming motor 171, the cam 170 having a projection 172 engageable with the push button of switch 49 once during each timed revolution of cam 170. As shown, one terminal of timing motor 171 is grounded and the other terminal thereof is connected to power supply conductor 48 through a master control switch 173.

The burettes 119 and 126 may be of the remotely controlled and/or programmed adjustable-capacity type, such as is disclosed in the application of Joseph C. Wasilewski and Horton E. Dorman, Ser. No. 511,465, filed Dec. 3, 1965, and entitled, "Fluid Pressure-Operated Burette System."

The apparatus above described is especially advantageous for performing steps in an analytical procedure, such as automatic sequential delivery of a sample, such as a pharmaceutical tablet, soluble in a suitable solvent, or other solid or liquid sample; dissolution of the sample using rapid stirring or ultrasonic disintegration, filtering of the resultant solution, precise volume measurement and removal of an aliquot of the filtered solution and automatic dilution of the filtered solution with a preselected volume of solvent solution, delivery of the filtered sample solution and solvent to a beaker followed by suction of the solution through a flow cell in an ultraviolet-visible range spectrophotometer whose wavelength is remotely and automatically preset. The wavelength setting for each sample series is chosen to correspond to the most sensitive measurement of absorbance change of the resulting solution due to quantity of active chemical in the original tablet or sample.

The concentration of active chemical ingredient is related to the photomultiplier current measurement in a spectrophotometer (transmission) as follows:

$$c = -\log T/ab$$

where $c$ is the concentration, $T$ is the transmission of the solution, $a$ is the molar absorptivity of the solution, and $b$ is the path length of the cell.

By using a recorder which converts the photomultiplier current to a logarithmic readout, there is thus provided a recorder response linearly related to the concentration of active chemical in the original sample.

The above steps are performed in a regular sequence which is continuously repeated with successive like amounts of the sample with precise repetitive regularity.

While a specific embodiment of an automatic analytical apparatus has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. An analytical apparatus comprising endless belt conveyor means, spaced containers secured on said belt conveyor means, means to drive said belt conveyor means, sample feed means having sample discharge means located over a container on the belt conveyor means, reagent supply means having reagent discharge means located over a container on said belt conveyor means, readout extraction means having intake conduit means receivable in a container on said belt conveyor means for extracting treated sample material for testing, waste-receiving means subjacent an end of the belt conveyor means, and container-cleaning means mounted beneath the belt conveyor means for cleansing inverted emptied containers as they pass along the bottom of the belt conveyor means.

2. The analytical apparatus of claim 1, and container-drying means beneath the belt conveyor means spaced ahead of the container-cleaning means in the direction of movement of the containers along the bottom of the belt conveyor means.

3. The analytical apparatus of claim 1, and means to operate the drive means in steps corresponding to the spacing between the containers on the belt conveyor means.

4. The analytical apparatus of claim 1, and wherein said belt conveyor means includes a portion having two rows of longitudinally spaced containers, the sample discharge means and the reagent discharge means being located to deliver material to the containers of one row and the intake conduit means of the readout extraction means being located to extract material from the containers of the second row, means located between the reagent discharge means and said intake conduit means to extract a sample of treated material from a container of said first row and deliver it to a container of said second row, and means to add further reagent to said last-named sample when it is transferred from said first row to said second row.

5. The analytical apparatus of claim 1, and agitator means mounted over the belt conveyor means and being engageable in a container spaced ahead of the sample discharge means and reagent discharge means in the direction of movement of the containers.

6. The analytical apparatus of claim 5, and solution-extracting means mounted over the belt conveyor means and having an intake conduit engageable in a container spaced ahead of the agitator means, filter means, a discharge conduit located so as to empty into a container spaced ahead of said last-named intake conduit in the direction of movement of the containers, and conduit means connecting the output of said solution-extracting means to said last-named discharge conduit through said filter means, the intake conduit means of the readout extraction means being located to receive sample material after it has passed through said filter means.

7. The analytical apparatus of claim 6, and means to operate the drive means in steps corresponding to the spacing between the containers on the belt conveyor means, the reagent discharge means being located one step ahead of the sample discharge means, the agitator means being located one step ahead of the reagent discharge means, and the intake conduit of the solution-extracting means being located one step ahead of the agitator means.

8. The analytical apparatus of claim 7, and wherein the belt conveyor means includes a portion having two side-by-side rows of longitudinally spaced containers, the filter discharge conduit being located to empty into the containers of one row and the intake conduit means of the readout extraction means being located to receive material from the containers of the other row, means to transfer sample quantities of the filtered treated material from the containers of said one row to the containers of said other row, and means to add additional reagent material to said sample quantities when they are transferred to the containers of said other row.

9. The analytical apparatus of claim 8, and wherein said belt conveyor means comprises a first section provided with a single row of containers and said portion comprises a second section provided with the two rows of containers, and means coupling said sections for simultaneous movement in opposite directions.

10. The analytical apparatus of claim 9, and wherein said belt conveyor sections are arranged in parallel relationship.

References Cited

UNITED STATES PATENTS

| 3,081,158 | 3/1963 | Winter | 23—253 |
| 3,098,719 | 7/1963 | Skeggs. | |
| 3,193,359 | 7/1965 | Baruch et al. | 23—253 XR |
| 3,219,416 | 11/1965 | Natelson | 23—259 XR |
| 3,223,485 | 12/1965 | Ferrari et al. | 23—253 |

MORRIS O. WOLK, *Primary Examiner.*

R. E. SERWIN, *Assistant Examiner.*

U.S. Cl. X.R.

23—259; 141—130; 134—15, 32